May 20, 1952 R. H. FREEMAN 2,597,090

VARIABLE ATTENUATOR

Filed May 19, 1949 2 SHEETS—SHEET 1

ROBERT H. FREEMAN

*INVENTOR.*

*BY* Kolo Kleyer attorney

May 20, 1952 R. H. FREEMAN 2,597,090

VARIABLE ATTENUATOR

Filed May 19, 1949 2 SHEETS—SHEET 2

ROBERT H. FREEMAN
INVENTOR.

BY Robert Meyer
Attorney

Patented May 20, 1952

2,597,090

UNITED STATES PATENT OFFICE 2,597,090

VARIABLE ATTENUATOR

Robert H. Freeman, Millburn, N. J., assignor to The Daven Company, Newark, N. J., a corporation of New Jersey Application May 19, 1949, Serial No. 94,087

6 Claims. (Cl. 178—44)

This invention relates to a variable attenuator for radio frequency waves in electro-communication, and one which is particularly applicable for use in signal generators, field strength measuring equipment, nucleonic and atomic research, testing of television receivers, wide-band amplifiers, pulse amplifiers, and any application where attenuation of ultra high frequency is required.

An object of the present invention is to provide a radio frequency variable attenuator embodying any desired number of steps adjustable or controllable, which has a high degree of impedance and resistor accuracy and one in which the steps of attenuation are controlled by a plurality of individual push button switch controlled units connected in series and each unit located in an independent cavity or chamber in the housing of the attenuator.

Another object of the present invention is to provide a variable attenuator as specified wherein the unit containing chambers or cavities have surge or characteristic impedance of approximately a predetermined number of ohms, for example, of approximately 75 ohms for use in 75 ohm transmission lines, in which the characteristic impedance of the chambers or cavities can be reduced a predetermined amount, for example, to approximately 50 ohms for use in 50 ohm transmission lines by connecting to the units and grounding to the housing condensers of the desired shunt capacity.

A further object of the invention is to provide in an attenuator as specified, electrical shields extending across or bisecting the cavities or chambers from input and output sides thereof to prevent energy from the input sides of the cavities leaking to the output sides thereof, and to ground said shields to the attenuator housing and further to provide independent ground connections to the housing of the input and output sides of the switch elements of the attenuator.

With these and other objects in view, as may appear from the accompanying specification, the invention consists of various features of construction and combination of parts, which will be first described in connection with the accompanying drawings, showing a variable attenuator of a preferred form embodying the invention, and the features forming the invention will be specifically pointed out in the claims.

Figures 1, 2, 3, 4, 5:
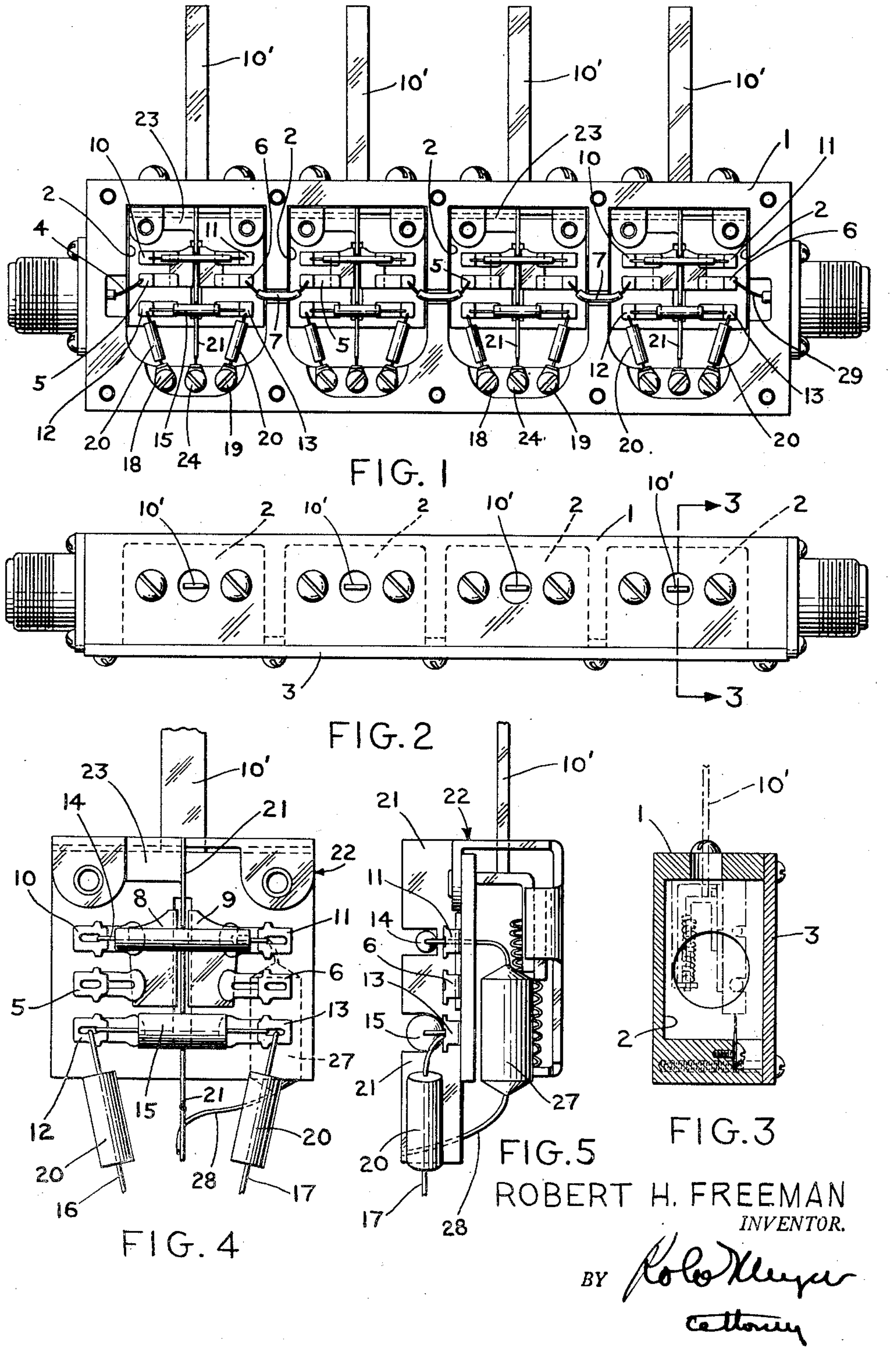
Figure 1 is a side elevation of the improved variable attenuator having the cover plate of the housing removed.
Figure 2 is a top plan of the variable attenuator.
Figure 3 is a vertical cross section taken on the line 3—3 of Figure 2.
Figure 4 is an enlarged front view of one of the push button operated switches of the attenuator showing a characteristic impedance condensor attached thereto.
Figure 5 is an edge elevation of the attenuator element shown in Figure 4.

Referring more particularly to the drawings, the improved variable attenuator includes a housing 1 which is formed of a single piece of metal, either cast or otherwise manufactured and provided with a plurality of longitudinally spaced cavities or chambers 2 therein opening out through one face of the housing 1. A cover plate 3 is detachably attached to the housing to form a closure for the various cavities or chambers 2. An attenuation unit is mounted in each of the cavities 2 and the attenuation unit in the first of the cavities has the central input contact 5 connected by a suitable wire 4 to the input medium (not shown). The output contact 6 of the intermediate contacts is connected by a suitable wire connection 7 with the intermediate input contact 5 of the successive attenuation unit mounted in the second cavity and thus all of the attenuation units mounted in the respective cavities are connected in series. The attenuation unit shown specifically in Figures 4 and 5 of the drawings is in the form of a push button or push arm operated switch structure including a pair of spaced flat contact plates 8 and 9 which are moved by longitudinal movement of the push lever 10' so that contact is established between the intermediate input and output contacts 5 and 6 and the upper input and output contacts 10 and 11, respectively, or when the lever 10' is pushed inwardly or downwardly the plates 8 and 9 establish contact with the input contact 12 and the output contact 13. The switch structure just described in its particular construction forms no part of the present invention since it is purchasable upon the open market. The contacts 10 and 11 are bridged or connected by a wire 14 while the contacts 12 and 13 are connected through a resistor 15. The contacts 12 and 13 are connected to ground through resistors 20 and wires 16 and 17 to individual ground connections 18 and 19, respectively, attached to the housing 1. A metallic electrical shield 21 is attached to the mounting plate 22 of the attenuation unit such as by the attaching plate 23 and it extends completely across the cavity 2 between the input and output connections 5, 10 and 12, and 6, 11 and 13, and between the facing edges of the switch plates 8 and 9. The electrical shield 21 is grounded to the housing 1 through an independent ground connection 24. To provide proper and efficient operation of the attenuator it is necessary that the independent ground connections 18, 19, and 24 be provided and that these three connections are not consolidated into a single connection with the housing.

In the constructing of the housing 1, the cavities or chambers 2 are made in a definite predetermined size so that they will have surge or characteristic impedance of approximately a predetermined number of ohms. An example is: that the cavity is so proportioned when the attenuator is to be used in 75 ohm transmission lines as to provide the desired characteristic impedance. They can be made in any definite size depending upon the transmission lines in which the attenuator is to be used. For the purpose of standardization, that is, to permit an attenuator which is adapted for use in a 75 ohm transmission line for use in a 50 ohm transmission line, the unit is constructed so that a condenser as shown at 27 in Figures 4 and 5 of the drawings may be located behind the insulating plate 22 and has one end connected to the output contact 11 and the other end connected by a suitable wire 28 to the electrical shield 21 and thus grounded to the housing through the ground connection of the electrical shield.

The intermediate outlet contact 6 of the final attenuation unit of the series is connected to the output by a suitable wire shown at 29.

Figures 6, 7:
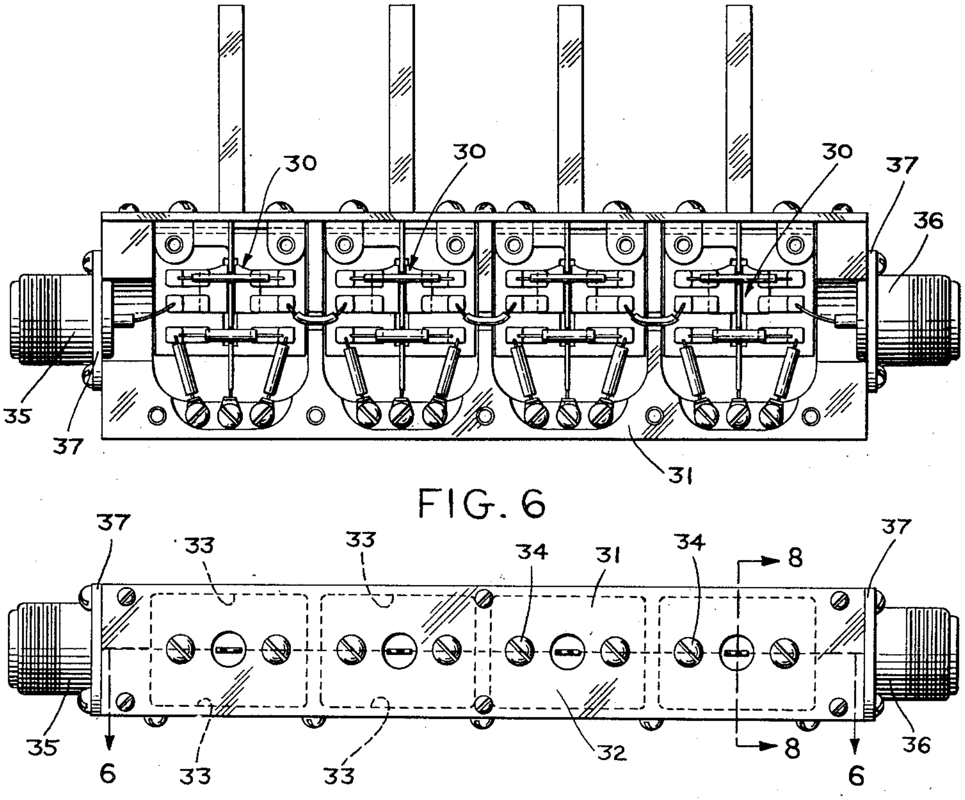
Figure 6 is a side elevation of a modified form of the variable attenuator structure with one-half of the enclosing housing removed and taken on the line 6—6 of Figure 7.
Figure 7 is a top plan of the modified form of the variable attenuator.
Figure 8:
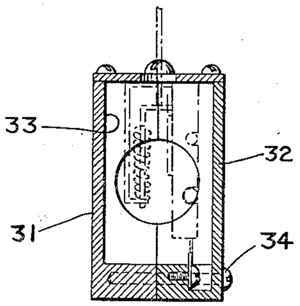
Figure 8 is a vertical cross section through the modified form of the attenuator and taken on the line 8—8 of Figure 7.

Figures 6, 7, and 8 of the drawings show a slightly modified form of the variable attenuator in which the attenuation units generically indicated by 30 are the same as the units shown and described in Figures 1 to 5 of the drawings, the difference between the modified form and the preferred form of the invention being that the housing of the attenuator is made substantially in longitudinal halves with the half 31 serving as the body and the half 32 serving as the cover. The body 31 and the cover 32 are provided with registering cavities 33 which when the body is assembled, as shown in Figure 7 of the drawings, form the cavities or chambers for contacting the attenuation units and the area of these cavities 33 are the same as the areas of the cavities 2, providing the desired characteristic impedance. In assembling, the body 31 and cover 32 are placed with their inner recessed surfaces facing and they are connected by suitable connecting bolts 34 so as to form the tightly sealed housing for the attenuation units. The input and the output connections 35 and 36, respectively, are carried by suitable attaching plates 37 which are connected to the ends of the housing 31 and cover 32, as clearly shown in Figures 6 and 7 of the drawings.

It will be understood that the invention is not to be limited to the specific construction or arrangement of parts shown, but that they may be widely modified within the invention defined by the claims.

What is claimed is:

1. In an attenuator, a housing having a plurality of independent spaced cavities therein, each of said cavities being so proportioned as to provide characteristic impedance of approximately a predetermined number of ohms, attenuation elements in said cavities and independent ground connections between the input and output sides of said attenuation elements and said housing, and a condenser connected to the output side of each attenuation element and grounded to said housing for decreasing the characteristic impedance of said cavities and a connector between the output of the attenuator elements in one cavity and the input attenuator elements of the successive cavity to connect the elements in all of the cavities in series.

2. In an attenuator, a housing having a plurality of independent spaced cavities therein, each of said cavities being so proportioned as to provide characteristic impedance of approximately a predetermined number of ohms, attenuation elements in said cavities and independent ground connections between the input and output sides of said attenuation elements and said housing, metallic electric shields extending across said cavities for preventing leakage of energy from the input to the output sides of the cavities, a ground connection from said electrical shield to said housing, said last named ground connection being independent from the ground connections of the input and output sides of said attenuation elements, and condensers connected to the output sides of each of said attenuation elements and connected to said electrical plate for grounding through the ground connection of the electrical plate a connector between the output of the attenuator elements in one cavity and the input attenuator elements in the successive cavity to connect the attenuator elements in all of the cavities in series.

3. In an attenuator as claimed in claim 2 wherein said cavities open out through one side of said housing, and a cover plate detachably connected to the housing and closing said cavities.

4. In an attenuator as claimed in claim 2 wherein said cavities open out through one side of said housing, and a cover plate detachably connected to the housing and closing said cavities, said cover plate having cavities therein registering with the cavities in said housing.

5. In an attenuator, a housing having a plurality of independent spaced cavities therein, each of said cavities being so proportioned as to provide characteristic impedance of approximately a predetermined number of ohms, attenuation elements in said cavities and including central input and output contacts upper input and output contacts and lower input and output contacts, a connector between the output of the attenuator elements in one cavity with the input attenuator elements of the successive cavity to connect the attenuator elements in all of the cavities in series, a resistor bridged connection between the lower input contact and the lower output contact, a slidable switch plate for establishing contact between said center input and center output contacts with either the upper or lower input and output contacts, shunt impedance elements connected to the lower input and output contacts and said housing, a metallic electric shield extending across each of the cavities for preventing leakage of energy from the input and output sides of the cavities, and a ground connection from said electrical shield to said housing independently of the input and output ground connections a conducting connector connecting said upper input contact and said upper output contact, and a resistor connecting said lower input contact and said lower output contact.

6. In an attenuator, a housing having a plurality of independent spaced cavities therein, each of said cavities being so proportioned as to provide characteristic impedance of approximately a predetermined number of ohms, attenuation elements in said cavities and including central input and output contacts upper input and output contacts and lower input and output contacts, a connector between the output of the attenuator elements in one cavity and the input attenuator elements of the successive cavity to connect the attenuator elements in all of the cavities in series, a resistor bridged connection between the lower input contact and the lower output contact, a slidable switch plate for establishing contact between said center input and center output contacts with either the upper or lower input and output contacts, shunt impedance elements connected to the lower input and output contacts and said housing, a metallic electric shield extending across each of the cavities for preventing leakage of energy from the input to the output sides of the cavities, and a ground connection from said electrical shield to said housing independently of the input and output ground connections a conductive connector connecting said upper input contact and said upper output contact, and a condenser connected to the upper output contact of each attenuation element and grounded to said housing for decreasing the characteristic impedance of said cavities.

ROBERT H. FREEMAN.

REFERENCES CITED

The following references are of record in the file of this patent:

UNITED STATES PATENTS

| Number | Name | Date |
|---|---|---|
| 1,905,353 | Potter | Apr. 25, 1933 |
| 1,957,538 | Jensen | May 8, 1934 |
| 2,286,029 | Van Beuren | June 9, 1942 |

FOREIGN PATENTS

| Number | Country | Date |
|---|---|---|
| 546,205 | Great Britain | July 2, 1942 |

OTHER REFERENCES

M. I. T. Radiation Laboratory Series, vol. 18, "Vacuum Tube Amplifiers" by Valley and Wallman, published by McGraw-Hill Book Co., Inc., 1948, pages 315 and 316. (Copy in Div. 69.)